March 4, 1969  J. S. DRYBREAD, SR., ET AL  3,430,376
LICENSE PLATE HOLDER
Filed Aug. 8, 1966
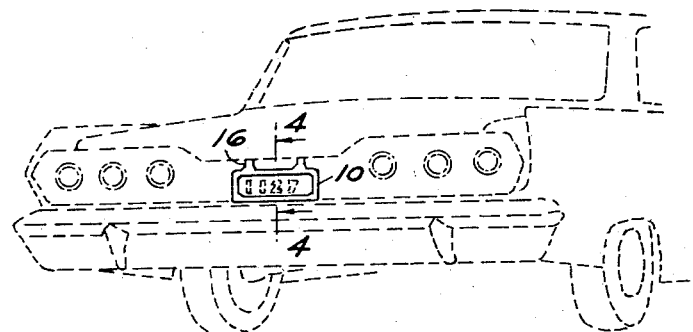
FIG.1
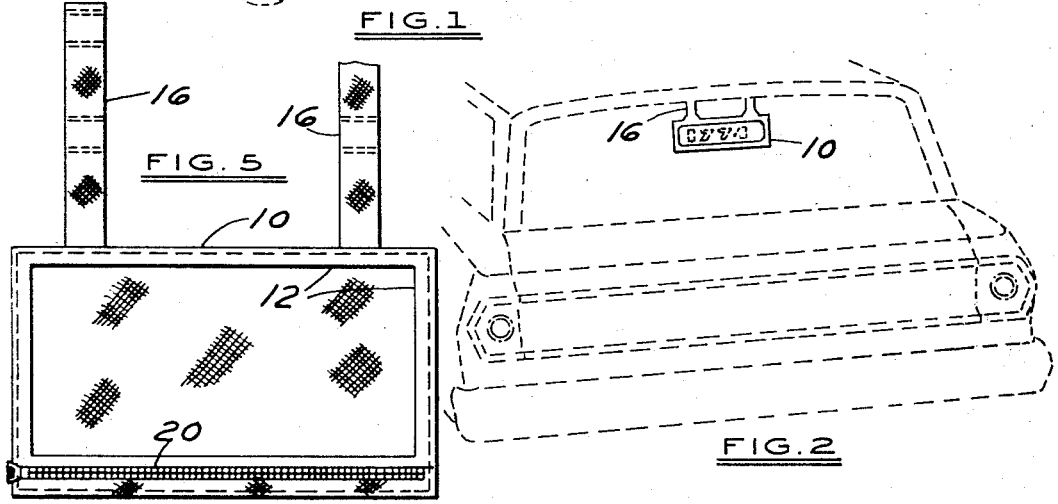
FIG.5
FIG.2
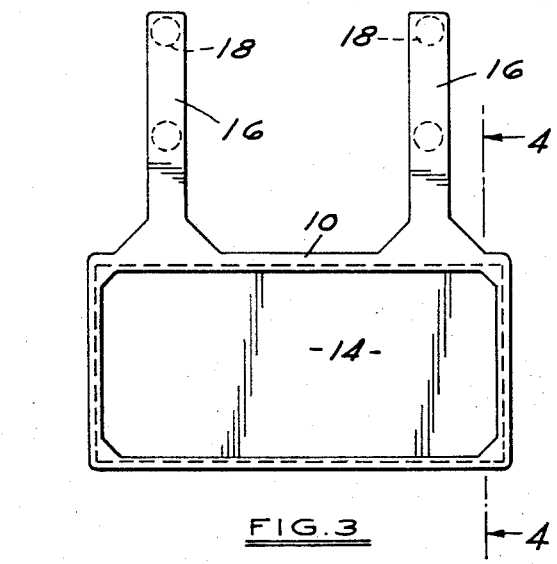
FIG.3
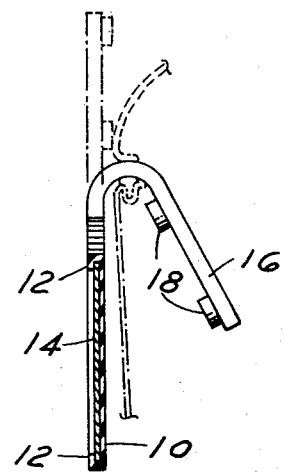
FIG.4
INVENTORS
JOHN S. DRYBREAD SR.
DALE C. FRITZ
BY
*Burton & Parker*
ATTORNEYS

United States Patent Office 3,430,376
Patented Mar. 4, 1969

3,430,376
LICENSE PLATE HOLDER
John S. Drybread, Sr., R. Rte. 4, Box 325, and Dale C. Fritz, 813 S. Franklin St., both of Winamac, Ind. 46996
Filed Aug. 8, 1966, Ser. No. 570,831
U.S. Cl. 40—209         4 Claims
Int. Cl. G09f 7/18

ABSTRACT OF THE DISCLOSURE

This disclosure relates to an automobile license plate holder adapted to quickly receive a license plate and to carry the same and to permit quick removal of the plate therefrom, and which holder so supports the plate that when the holder is secured to an automobile body the plate carried thereby is clearly exposed to public view. The plate holder is provided with attaching means secured thereto whereby it may be quickly attached to an automobile body to be carried by the body through such attaching means being releasably gripped between relatively shiftable parts of the body such as between the upper edge of the trunk compartment and the shiftable trunk lid or between the upper edge of a windowpane and the upper edge of the window opening. When the plate holder is so attached to an automobile body it overlies an outer surface of the body and it may move over such outer surface during the travel of the automobile but the holder is so formed and the plate is so carried by the holder that neither the holder nor the license plate carried thereby, nor the attaching of the holder to the body or detaching of the holder from the body will mar in any way the outer surface of the body.

---

This invention relates to an improved license plate holder for automobiles.

This plate holder is designed to carry the plate in such a manner that the holder can be attached to the car within a minimum period of time and so that the plate is plainly visible when the holder is so attached to the car, and when the car is delivered the holder and plate may be removed from the car within a minimum period of time.

Our plate holder is of such a character that it may be attached between any one of several relatively shiftable parts of an automobile body as between the upper edge of the trunk compartment and the trunk lid, or between the upper edge of the hood and the hood lid, or between the upper edge of the rear window in a station wagon and the upper channel of the window opening into which the window is moved when it is closed. The plate holder ith its plate mounted therein is just as quickly removed from the car by moving the shiftable body part so that the plate holder can be released from engagement between the two relatively shiftable parts of the body.

A meritorious feature is that the plate holder is formed of protective, cushion material which is so engaged with the plate as to prevent contact of the plate directly against the finished surface of the car body and the plate is so supported as to prevent it from marring or disfiguring the body finish in any way during travel of the car over the road. The plate holder itself will not mar the car body upon contact therewith or movement thereover because of the soft cushion-like character of the material from which it is formed.

Another meritorious feature is that the plate holder is so constructed that it is capable of being mounted upon the car body by means which does not mar or deface the finish of the body in any way and whereby the plate holder may be quickly attached to the body and as quickly released therefrom.

Another object is the provision of a plate holder so constructed that the license plate may be quickly mounted thereupon and the holder will completely protect any part of the license plate carried thereby from coming into contact with or marring the finish of the body, and the supporting means whereby the plate holder is connected with the body is of such a character that its connection therewith will not mar the body in any way.

Other objects, advantages, and meritorious features will more fully appear from the following specification, claims and accompanying drawing wherein:

FIG. 1 is a cut-away perspective of the rear end of a conventional automobile body shown in dotted outline, with our plate holder secured thereto by having a portion thereof gripped between the upper edge of the trunk compartment and the trunk lid so as to properly expose the license plate at the rear of the trunk;

FIG. 2 is a perspective of a cut-away portion of an automobile station wagon shown in dotted outline with our improved plate holder shown in solid outline and with the plate holder supported to display the license plate overhanging the rear window and with the holder having its supporting portions gripped between the top margin of the window and the upper runway within which such margin is received;

FIG. 3 is an elevation of our plate holder with the license plate mounted thereon;

FIG. 4 is a cross section taken on the line 4—4 of FIG. 3; and

FIG. 5 is an elevation similar to that of FIG. 1 but showing a modified form of a license plate holder.

The plate holder is shown in the several figures of the drawing as indicated by the numeral 10. It may be formed of rubber or other suitable plastic or generally similar material. The plate holder material is preferably of a compressible cushion-like resilient character that will not mar the finish of any part of an automobile body by coming in contact therewith in its movement thereover. This plate holder is shown in FIG. 3 as comprising a sheet-like portion slightly overside the conventional State license plate so that it may extend completely over the back of a license plate and protect any portion of the license plate carried by the holder from coming in contact with a finished surface portion of the automobile.

The holder illustrated in the first four figures of the drawing is provided with a marginal flange which extends inwardly from the margin of the holder over the adjacent portion thereof and is undercut so as to receive thereunderneath the margin of a license plate 14, as shown particularly in FIG. 4. It will be seen in FIG. 4 that the back of the plate is completely covered by the plate holder and the margin of the plate is completely surrounded by the marginal flange of the holder so that a plate carried by the holder cannot come in contact with a surface of the body over which the plate is suspended in the manner shown in any one of the figures of the drawing.

Preferably the plate carrying portion of the holder has supporting means formed of flexible, compressible, rugged material. Such supporting means is so constructed that it may be gripped between two movable parts of a motor vehicle body as, for example, the upper edge of the trunk compartment and the lid of the trunk, as shown in FIG. 1, or the upper edge of the rear window of a station wagon and the upper runway into which the upper margin of the window is received when it is closed, as shown in FIG. 2. It might be gripped between the upper margin of the hood and cover of the hood if it were desired to display the plate at the front end of the body.

As shown in the figures of the drawing, the supporting means is illustrated as extensions of the material of the plate holder proper and therefore formed of the same material. The supporting means is also shown as preferably constructed in the form of two strap-like portions 16. These strap-like portions are flexible so that, as illustrated in FIG. 4, they may be bent over the upper edge of the rear wall of a trunk compartment and the lid closed down thereupon so as to grip these extensions therebetween. The stray-like extensions 16, if formed of flexible and compressible material as would be the case where the plate holder was formed of rubber, whether natural or artificial rubber or other plastic, would compress sufficiently to permit the lid of the trunk to be fastened by the normal catch with which it is provided. The same is true if the plate holder were mounted at the front of the automobile body and held down by the lid of the hood. Likewise, when these strap-like portions 16 are gripped between the edge of the rear window of a station wagon and its seat the window may be closed sufficiently to serve its normal purpose.

Each strap is shown as having two button-like abutments or projections 18 projecting laterally from the strap and being of a thickness sufficient to prevent withdrawal of the strap from between the gripping margins of the relatively movable parts of the automobile body between which the straps are gripped. It is apparent that such would be the case.

It is apparent also that material other than rubber or plastic might be used. For example, a heavy fabric type of sheet material might be used to form the plate holder proper with stray-like extensions of flexible fabric or other suitable material secured thereto as shown in FIG. 5. The fabric material might have a marginal flange 12 extending around its margin and though such might not be sufficiently flexible and resilient to permit the plate to be readily inserted thereunder, fastening means in the form of a zipper such as is shown in 20, or other suitable fastening means might be provided to secure the whole plate within the holder proper. Any suitable conventional fastening means could be applied.

It is apparent that when a license plate is mounted in our improved plate holder as shown, whether in the manner illustrated in FIG. 5 or the other figures of the drawing or in any suitable manner, the back of the plate and the margin of the plate will be completely protected by the material of the holder so as not to come in contact with the surface of a body. The portion of the plate holder that constitutes the support or connecting means which attaches it to the body is of such a character that contact with the body surface or movement thereover will not mar such surface in any way. It is likewise apparent that the securing of the plate holder to a conventional automobile body so as to display a license plate in a suitable manner may be very quickly accomplished and the plate holder may likewise be very quickly released therefrom.

If desired the registration certificate may be placed within a flat envelope and mounted back of the license plate and held within the holder underneath the license plate, and it is apparent that such would be securely held therein against loss. If the license plate or plates intended for permanent use on the car were delivered with the car and sent therewith in the plate holder or holders, as the case might be, it is likewise apparent that the time required to attach such plates permanently to the car is saved to the dealer through the use of our plate holders.

What is claimed is:

1. An automobile license plate holder comprising, in combination, a plate carrying and protective portion adapted to be secured to and to overlie the back of the plate, said plate holder portion formed of a material adapted to contact and be moved over a finished surface of an automobile body without marring the finish of the body, said plate carrying and protective portion provided with supporting means projecting away from said portion and adapted to be gripped and held between relatively shiftable parts of an automobile body which parts are movable toward and away from each other to grip said means therebetween or to release the same from such gripping engagement, and wherein said supporting means is characterized as being formed of flexible material, and wherein the plate holder portion which is adapted to overlie the back of a license plate is provided with fastening means that is adapted to releasably secure a license plate thereupon.

2. An automobile license plate holder as defined in claim 1, wherein such supporting means is further characterized as being formed of two flexible strap-like portions of material projecting away from the top of the plate holder and each such strap-like portion is provided with an abutment projecting laterally therefrom and adapted to restrain withdrawal of the strap-like portion from between said gripping parts of the automobile body.

3. An automobile license plate holder as defined in claim 2, wherein said supporting means is characterized as being formed of two flexible strap-like extensions of the plate holder material adjacent to opposite ends thereof, each extension provided with a button-like part of increased thickness and formed of the same material as the extension.

4. An automobile license plate holder comprising, in combination, a plate carrying and protective portion adapted to be secured to and to overlie the back of the plate, said plate holder portion formed of a material adapted to contact and be moved over a finished surface of an automobile body without marring the finish of the body, said plate carrying and protective portion provided with supporting means projecting away from said portion and adapted to be gripped and held between relatively shiftable parts of an automobile body which parts are movable toward and away from each other to grip said means therebetween or to release the same from such gripping engagement, and wherein the plate holder portion which is adapted to overlie the back of a license plate is provided with an undercut marginal flange that overhangs inwardly the margin of the plate holder to receive thereunderneath the margin of a license plate overlying the plate holder securing the plate thereto, and characterized in that the flange-like portion of the holder is separable therefrom along one margin of the plate holder proper to permit insertion of a license plate therethrough, and fastening means is provided to fasten such separable flange portion to the plate holder to secure the plate thereto.

References Cited

UNITED STATES PATENTS

| 2,723,474 | 11/1955 | Minter | 40—16 |
| 2,910,793 | 11/1959 | Helmer et al. | 40—209 |
| 2,931,114 | 4/1960 | Peterson | 40—10 |
| 2,933,841 | 4/1960 | Lawlor. | |

FOREIGN PATENTS 795,492   5/1958   Great Britain.

EUGENE R. CAPOZIO, *Primary Examiner.*

WENCESLAO J. CONTRERAS, *Assistant Examiner.*

U.S. Cl. X.R.

40—129